United States Patent
Fischer et al.

[11] Patent Number: 5,979,905
[45] Date of Patent: Nov. 9, 1999

[54] METAL SEALING GASKET

[75] Inventors: Jan-Peter Fischer, Hadamar; Dieter Reifenröther, Betzdorf; Hans Georg Düber, Herdorf, all of Germany

[73] Assignee: Goetze Payen GmbH, Herdorf, Germany

[21] Appl. No.: 08/929,797

[22] Filed: Sep. 15, 1997

[30] Foreign Application Priority Data

Sep. 13, 1996 [DE] Germany ................ 196 37 356

[51] Int. Cl.⁶ .................................................. F02F 11/00
[52] U.S. Cl. ........................................... 277/591; 277/598
[58] Field of Search ................................. 277/598, 591

[56] References Cited

U.S. PATENT DOCUMENTS

| | | | |
|---|---|---|---|
| 2,135,807 | 11/1938 | Fitzgerald | 428/591 |
| 5,295,699 | 3/1994 | Inoue | 277/598 |
| 5,362,074 | 11/1994 | Gallo | 277/598 |

FOREIGN PATENT DOCUMENTS

| | | |
|---|---|---|
| 0 500 273 | 8/1992 | European Pat. Off. . |
| 0 691 491 | 1/1996 | European Pat. Off. . |
| 56074887 | 5/1981 | Japan . |
| 56074888 | 5/1981 | Japan . |

*Primary Examiner*—James R. Brittain
*Assistant Examiner*—Gary Grafel
*Attorney, Agent, or Firm*—Venable; Gabor J. Kelemen

[57] ABSTRACT

A metal sealing gasket includes first and second opposite, superposed metal cover plates; and an aperture provided in each cover plate. The apertures are in alignment with one another to define a thoroughgoing opening in the metal sealing gasket. Further, first and second projections are provided which form part of the first and second cover plates, respectively. The first and second projections extend into the opening and have overlapping portions which are in a contacting relationship with one another. The first and second projections are situated in their entirety within the opening and thus do not project outwardly beyond the outer surfaces of the cover plates.

7 Claims, 1 Drawing Sheet

METAL SEALING GASKET

CROSS REFERENCE TO RELATED APPLICATION

This application claims the priority of German Application No. 196 37 356.5 filed Sep. 13, 1996, which is incorporated herein by reference.

BACKGROUND OF THE INVENTION

This invention relates to a flat metal sealing gasket, particularly a cylinder head gasket for an internal-combustion engine. The sealing gasket is of the type which is formed of a laminate composed of at least two superposed metal plates having peripheral recesses or thoroughgoing openings as well as projections extending from an inward edge of the recesses or thoroughgoing openings for a form-locking securement of the plates to one another.

For handling the installation-ready sealing gasket up to the installation work proper, a secure connection between the individual metal plates is necessary. Several techniques are known for connecting the individual sheet metal plates with one another in a non-releasable manner. Preferably additional components, such as rivets or framing rings have been used which are often mounted in additional thoroughgoing passages of the sealing gasket. Dependent on the geometry of the article and the number of the securing points the individual layers may not lie flat on one another. The terminal regions bent around the gasket edge may assist to remedy such undesired occurrence.

European Patent No. 500 273 discloses a flat sealing gasket of the above-outlined type in which at least two metal plates are connected with one another by securing means which is provided in the gasket regions where the sealing properties are not affected. Thus, in an opening of one of the plates a bendable strip is arranged which, after bending about 180°, lies on the edge of the opening of another plate. It is a disadvantage of such a structure that, similarly to arrangements where rivets are used, the bent-around tab or rivets lie on the outer plates and thus increase the thickness of the seal in those regions. To avoid such an occurrence, in three-layer assemblies the middle plate has been provided with a recess. While, in this manner, the sealing pressure on the gasket is not increased, the flanking plates nevertheless have to be additionally deformed which results in undesired stresses in the plates, increasing the risks of rupture and thus jeopardizing the sealing behavior.

SUMMARY OF THE INVENTION

It is an object of the invention to provide an improved flat sealing gasket of the above-outlined type in which the superposed metal plates are secured to one another with simple and economical means without increasing the axial thickness of the sealing gasket in the regions of securement.

This object and others to become apparent as the specification progresses, are accomplished by the invention, according to which, briefly stated, the metal sealing gasket includes first and second opposite, superposed metal cover plates and an aperture provided in each cover plate. The apertures are in alignment with one another to define a thoroughgoing opening in the metal sealing gasket. Further, first and second projections are provided which form part of the first and second cover plates, respectively. The first and second projections extend into the opening and have overlapping portions which are in a contacting relationship with one another. The first and second projections are situated in their entirety within the opening and thus do not project outwardly beyond the outer surfaces of the cover plates.

The invention thus makes possible to connect to one another by economical means all the superposed sheet metal plates of the laminate—even if it concerns a sealing gasket in which the laminate is formed of only two plates—in such a manner that all plates are held in position without increasing the axial thickness of the flat sealing gasket.

Thoroughgoing apertures of the flat sealing gasket, present in any event as well as additional apertures may be provided with projections, such as tabs, arranged according to the invention. The sealing gaskets according to the invention are used preferably as cylinder head gaskets for internal-combustion engines but may also serve as exhaust flange seals or for other purposes. Instead of metal, the intermediate plates, if required, may be made of different material, such as felt.

DESCRIPTION OF THE PREFERRED EMBODIMENTS

Figure 1:
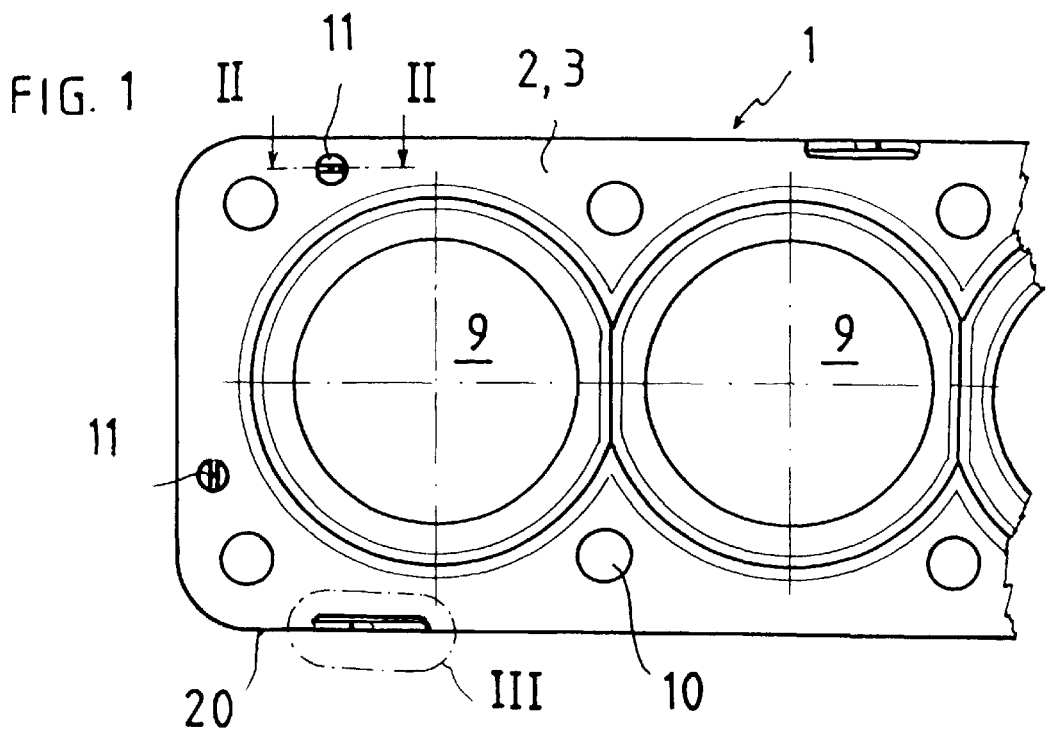
FIG. 1 is a top plan view of a sealing gasket according to the invention.
Figure 2:
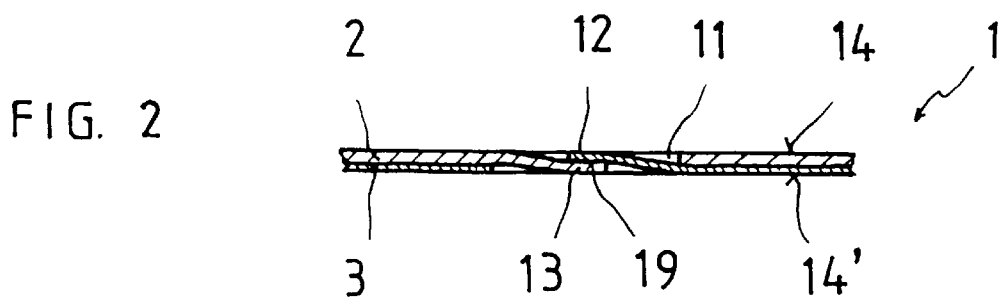
FIG. 2 is a sectional view taken along line II—II of FIG. 1.
Figure 3:
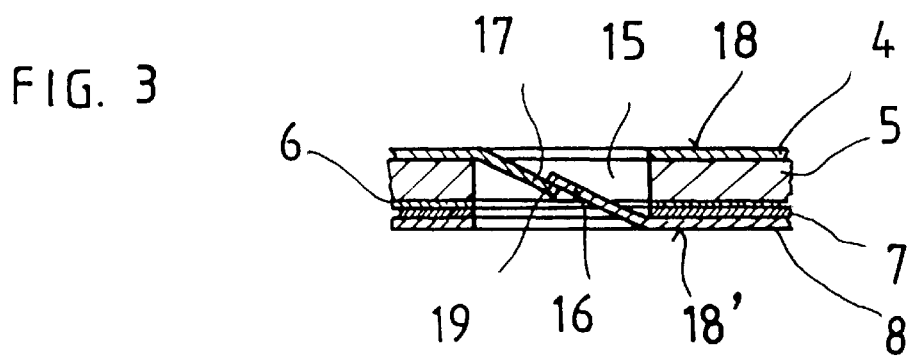
FIG. 3 is a sectional view of the inset III of FIG. 1, illustrating another preferred embodiment in a five-layer sealing gasket.

Turning first generally to FIGS. 1, 2 and 3, a metal sealing gasket, designated at 1 in FIG. 1 and adapted for use in the cylinder head of an internal-combustion engine, is formed of a laminate composed of a plurality of superposed plates. FIGS. 1 and 2 show two such plates 2, 3, whereas the structure shown in FIG. 3 has five such plates 4, 5, 6, 7, 8. In addition to the openings 9 for the combustion chambers of the engine cylinders, the sealing gasket has a plurality of holes 10 which may constitute passages for bolts or fluid openings forming part of coolant or oil channels.

The outer plates 2, 3 (FIG. 1) or 4, 8 (FIG. 3) are designated as functional layers or cover plates. Between the cover plates one or more intermediate layers or plates 5, 6 and 7 (FIG. 3) may be arranged. The plates are secured to one another to ensure that they lie flat on one another and that the individual openings in each plate are aligned.

Particularly referring to FIG. 2, the sealing gasket 1 has a thoroughgoing opening 11 formed of aligned apertures provided in the plates 2 and 3. From the edge defining the aperture of plate 2 there extends, generally into the area of the aperture, a resilient projection (tab) 12, whereas from the edge defining the aperture of plate 3 there extends, generally into the area of the aperture, a resilient projection (tab) 13. The tabs 12 and 13 which are provided by stamping or other separating processes, extend into the thoroughgoing opening 11 in a diametrally opposite orientation. By means of a non-illustrated tool, the tabs 12 and 13 are positioned over one another in such a manner that they have overlapping end portions in contact with one another. The plates 2 and 3 may have identical or different axial thicknesses. Since the overlapping zones of the plates 2 and 3 are arranged within the thoroughgoing opening 11, the tabs 12, 13 do not project beyond the upper face 14 and/or 14' of the cover plates 2, and 3, respectively. The length of each tab 12, 13 is greater than one half of a width dimension of the opening 11 measured along a plane which intersects the tabs 12, 13 in their entirety. It is noted that the plate securing arrangement (tabs 12, 13) may also be provided in an opening (such as opening 10) serving as a passage for a liquid (such as oil or coolant)

In the embodiment shown in FIG. 3, a connection is shown in a thoroughgoing opening (cutout) 15 of a five-layer sealing gasket. The opening 15 is situated in an edge region of the sealing gasket. Only the cover plates (outer plates) 4 and 8 are provided with respective tabs 17 and 16 according to the invention. The tabs 16 and 17 are generally parallel to the gasket edge where they are located and extend toward one another in opposite directions within the opening 15 in their entirety along a diagonal plane of the opening 15 and lie on one another with an inherent resilient return force generated by bending them into the opening 15 from the respective cover plate. Again, the tabs 16 and 17, similarly to the tabs 12 and 13 of the earlier described embodiment, do not project beyond the upper face 18, 18' of the cover plates 4 and 8, respectively. In the overlapping region 19 the tabs 16 and 17 may be additionally bonded to one another by gluing or welding. The tabs 12, 13 of the earlier-described embodiment too, may be similarly biased toward one another and/or secured to one another by a bond.

It will be understood that the above description of the present invention is susceptible to various modifications, changes and adaptations, and the same are intended to be comprehended within the meaning and range of equivalents of the appended claims.

What is claimed is:

1. A metal sealing gasket comprising
   (a) first and second opposite, superposed metal cover plates;
   (b) an intermediate layer sandwiched between said cover plates;
   (c) an aperture provided in each said cover plate and said intermediate layer; the apertures being in alignment with one another to define a thoroughgoing opening in the metal sealing gasket for the passage of a liquid; and
   (d) first and second resilient tabs forming part of said first and second cover plates, respectively; said first and second resilient tabs extending into said opening in their entirety along a diagonal plane of said opening and having overlapping portions being in a contacting relationship with one another; said first and second resilient tabs being situated in their entirety within said opening.

2. The metal sealing gasket as defined in claim 1, wherein said cover plates have identical thicknesses.

3. The metal sealing gasket as defined in claim 1, wherein said first resilient tab is bent out of said first cover plate and is urged to return, by an inherent resilient force, toward said first cover plate; further wherein said second resilient tab is bent out of said second cover plate and is urged to return, by an inherent resilient force, toward said second cover plate; said overlapping portions of said resilient tabs being urged into said contacting relationship by the inherent resilient forces.

4. The metal sealing gasket as defined in claim 1, wherein said overlapping portions are bonded to one another.

5. The metal sealing gasket as defined in claim 1, wherein said overlapping portions are welded to one another.

6. The metal sealing gasket as defined in claim 1, wherein each said resilient tab has a length greater than one half of a width dimension of said opening measured along a plane intersecting said projections in their entirety.

7. The metal sealing gasket as defined in claim 6, wherein the projections are of equal length as measured along said plane.

\* \* \* \* \*